Patented Dec. 12, 1933

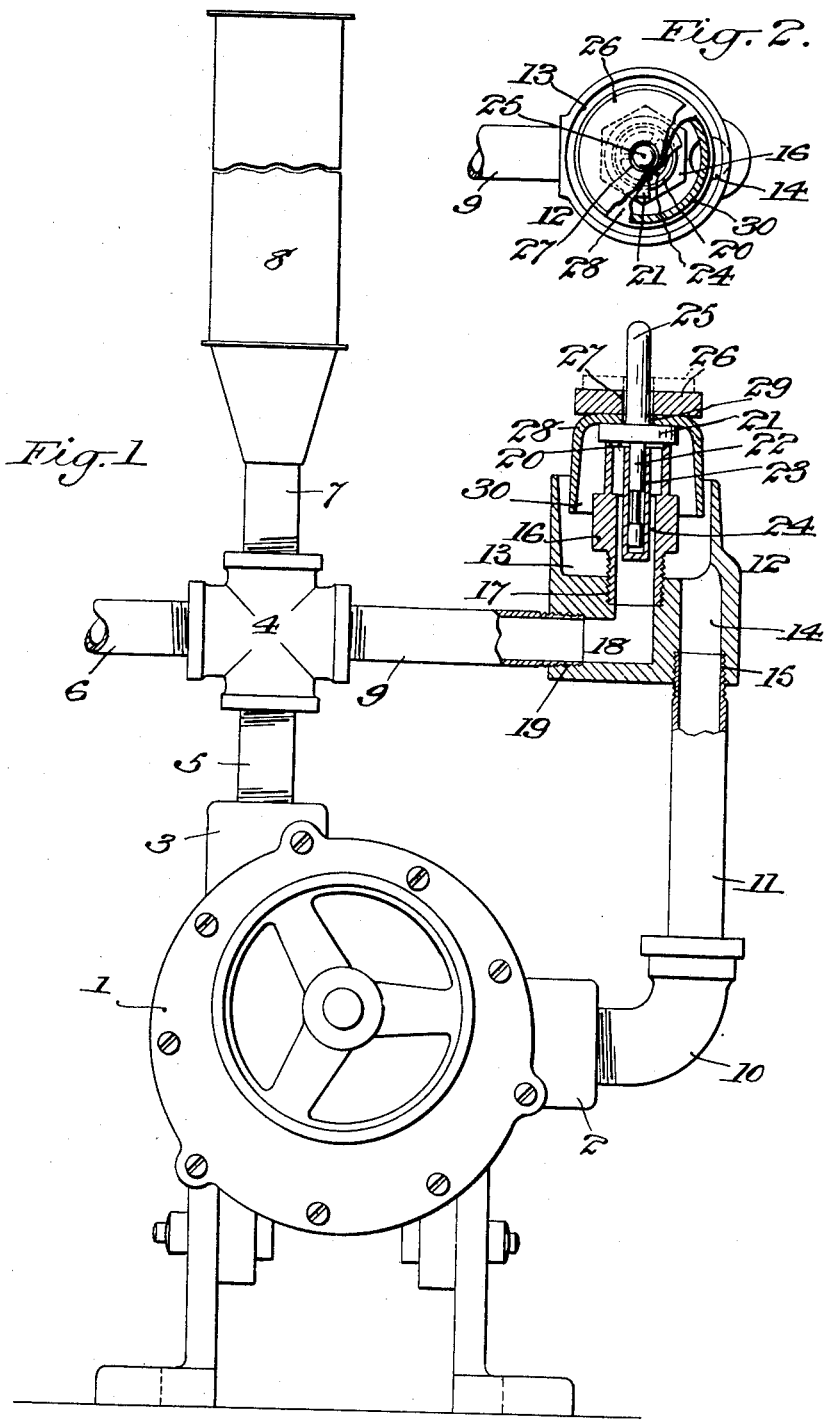

1,939,176

UNITED STATES PATENT OFFICE 1,939,176

VALVE FOR COMPRESSED AIR SYSTEMS

Gustave A. Leiman, New York, N. Y.

Application November 13, 1930
Serial No. 495,381

4 Claims. (Cl. 137—53)

This invention relates to an improvement in valves for compressed air systems and has for an object to provide a unit which will control the excess pressure of air to be exhausted from the system and confine it within limits adjacent the air inlet, thereby preventing oil which might be exhausted with the air from becoming sprayed into atmosphere and deposited upon adjacent objects, such as pulleys, belts, walls and furniture, etc.

Another object is to provide a unit which will serve to arrest the oil carried by the air passing through the air control and allow it to fall, by gravity, to a position where it will be returned to the pressure pump by suction through the air inlet.

Another object is to provide a unit which will impede the passage of the air and thereby muffle the sound caused by the air escaping through the air exhaust control.

Another object is to provide certain improvements in the form, construction and arrangement of the several parts whereby the above named and other objects may effectively be attained.

A practical embodiment of my invention is illustrated in the accompanying drawing, in which Fig. 1 represents a rotary pressure pump and its adjacent connections having my improved unit applied thereto; and Fig. 2 represents a plan view of the same, partly broken away to show parts below.

The rotary pressure pump denoted by 1 is of any well-known or approved construction having an inlet 2, an outlet 3 which is connected to a four-way coupling 4 by a nipple 5. This coupling 4 has a pipe 6 to direct the air from the outlet 3 to a supply tank (not shown), a nipple 7 to pass the air to a pressure tank 8 and a horizontally disposed exhaust pipe 9. The inlet 2 has connected therewith an elbow 10 and a vertically disposed inlet pipe 11. A unit 12 is provided at its upper end with a receptacle 13, open at the top, and a vertically disposed port 14, which passes downwardly from the bottom of the receptacle and connects at 15 with the inlet pipe 11.

A tubular member 16 is screw threaded into an opening 17 centrally arranged in the bottom of the receptacle 13, which opening 17 communicates with a port 18 having the exhaust pipe 9 screw threaded therein at 19. The tubular member 16 is provided at its upper end with a valve seat 20 arranged to receive a weighted plate valve 21, the depending stem 22 of which is disposed to slide longitudinally in a bearing 23 carried by and spaced from the walls of the member 16 to form passages 24 therebetween which connect with the port 18. The plate valve 21 is also provided with a stem 25 uprising therefrom, which stem is arranged to receive one or more weights 26 having a centrally arranged hole 27 for the reception of the stem 25, which weights serve to increase the pressure required for lifting the valve from its seat 20 to exhaust the air. Between the plate valve 21 and weight 26, there is interposed a deflector 28 having a hole 29 for the reception of the stem 25 and a depending outwardly flared wall 30 which surrounds the valve 21 and its seat 20 and extends downwardly into the receptacle 13, thereby partially closing the same. The wall 30 of the deflector 28 is spaced a slight distance from the interior wall of the receptacle 13 to allow the exhaust air to escape from the receptacle and permit the passage of air from the atmosphere to the inlet port 14.

In operation, the air to be compressed is drawn from the receptacle 13 through port 14, inlet pipe 11, elbow 10 to the inlet 2 of the pump 1, where it is compressed and forced through the outlet 3 to the four-way coupling 4, thence to the nipple 7, pressure tank 8 and exhaust pipe 9. The weighted plate valve 21 which normally rests on its seat 20 automatically controls the pressure of air in the system, which pressure may be increased or diminished by adding to or removing the weight 26 on the uprising stem 25 of the valve. When the air being compressed has reached the desired degree, any further pressure will tend to lift the valve 21 from its seat 20 and the excess pressure of air allowed to pass therebetween. As the air rushes past the valve and its seat, it will strike the vertical interior wall 30 of the deflector 28 and its course will be directed downwardly to the bottom of the receptacle 13, thence upwardly around the outside of the flared wall of the deflector to atmosphere. The tortuous path traveled by the escaping air tends to break its impetus and thereby dampen or muffle the sound.

Thus it will be seen that while the noise, caused by the air being exhausted into the atmosphere, will be muffled, the escaping air will be confined within a limited area, so that any fugitive oil passing between the valve and its seat with the air will be thrown against the wall 30 where it will fall, by gravity, into the receptacle 13 and thereby prevented from being sprayed into the surrounding atmosphere. As the oil is collected in the receptacle 13 and the air, at atmospheric pressure, drawn into the port 14 at the bottom of the receptacle, it is obvious that the oil will be carried with the air into the pump, thereby assisting in keeping the moving parts lubricated.

From the foregoing it will be seen that the device serves to combine, in a single unit of relatively small dimension, an automatic exhaust control, an air inlet, an oil collector, and a noise muffler, which collector and muffler are disposed between the air exhaust control and inlet.

It is also to be understood that while I have shown this unit connected with a rotary pump of an air pressure system, I wish it to be understood that the unit may be applied to any air pressure system having an inlet and an exhaust.

It is obvious that various changes may be resorted to in the form, construction and arrangement of the several parts without departing from the spirit and scope of my invention, and hence I do not intend to be limited to the details herein shown and described except as the same are set forth in the claims.

What I claim is:

1. A valve for compressed air systems comprising, a receptacle having an open upper end, an air exhaust outlet in said receptacle, a gravity operated plate valve provided with upper and lower stems, said lower stem being journaled in said outlet for guiding the plate valve, a seat on the outlet for said plate valve, said seat being disposed above the top of the receptacle, and a cup-shaped deflector loosely mounted on said upper stem and supported on the plate valve in position to surround the plate valve and seat to arrest the lubricant carried by the air passing therebetween, the lower end of the wall of the deflector being arranged to depend into the open upper end of the receptacle to partially close the receptacle and impede the passage of the air exhausted by the movement of the plate valve.

2. A valve for compressed air systems comprising, a receptacle having an open upper end, an air exhaust outlet in said receptacle, a gravity operated plate valve provided with upper and lower stems, said lower stem being journaled in said outlet for guiding the plate valve, a seat on the outlet for said plate valve, said seat being disposed above the top of the receptacle, a cup-shaped deflector loosely mounted on said upper stem in position to surround the plate valve and seat to arrest the lubricant carried by the air passing therebetween and having the lower end of its wall depending into the open upper end of the receptacle to partially close the receptacle and impede the passage of the air exhausted by the movement of the plate valve, and one or more weights slidably mounted on the upper stem and resting on top of the deflector to increase the resistance of the plate valve on its seat.

3. A valve for compressed air systems comprising, a receptacle having an open upper end, an air exhaust outlet in said receptacle, a gravity operated plate valve provided with upper and lower stems, said lower stem being journaled in said outlet for guiding the plate valve, a seat on the outlet for said plate valve, said seat being disposed above the top of the receptacle, a cup-shaped deflector loosely mounted on said upper stem in position to surround the plate valve and seat to arrest the lubricant carried by the air passing therebetween and having the lower end of its wall depending into the open upper end of the receptacle to partially close the receptacle and impede the passage of the air exhausted by the movement of the plate valve, and a port in the receptacle adapted to be connected with the air inlet of the system to withdraw the exhausted air and lubricant from the receptacle.

4. A valve for compressed air systems comprising, a receptacle having an open upper end, an air exhaust outlet in said receptacle, a gravity operated plate valve provided with upper and lower stems, said lower stem being journaled in said outlet for guiding the plate valve, a seat on the outlet for said plate valve, said seat being disposed above the top of the receptacle, a cup-shaped deflector loosely mounted on said upper stem in position to surround the plate valve and seat to arrest the lubricant carried by the air passing therebetween and having the lower end of its wall depending into the open upper end of the receptacle to partially close the receptacle and impede the passage of the air exhausted by the movement of the plate valve, one or more weights slidably mounted on the upper stem and resting on top of the deflector to increase the resistance of the plate valve on its seat, and a port in the receptacle adapted to be connected with the air inlet of the system to withdraw the exhausted air and lubricant from the receptacle.

GUSTAVE A. LEIMAN.